United States Patent [19]

Pfister et al.

[11] Patent Number: 4,528,096
[45] Date of Patent: Jul. 9, 1985

[54] DEVICE FOR HIGH GRADIENT MAGNETIC SEPARATION

[75] Inventors: Hans Pfister, Erlangen; Günter Rupp, Marloffstein, both of Fed. Rep. of Germany

[73] Assignee: Siemens Aktiengesellschaft, Munich, Fed. Rep. of Germany

[21] Appl. No.: 170,989

[22] Filed: Jul. 18, 1980

[30] Foreign Application Priority Data

Jul. 20, 1979 [DE] Fed. Rep. of Germany ....... 2929468

[51] Int. Cl.³ .............................................. B01D 35/06
[52] U.S. Cl. ...................................................... 210/222
[58] Field of Search ........................................ 210/222

[56] References Cited

U.S. PATENT DOCUMENTS

| | | | |
|---|---|---|---|
| 2,959,287 | 11/1960 | Daus et al. | 210/222 |
| 3,126,924 | 3/1964 | Kirkpatrick | 210/222 |
| 3,136,720 | 6/1964 | Baermann | 210/222 |
| 3,567,026 | 3/1971 | Kolm | 210/222 |
| 3,581,898 | 6/1971 | Tyrrell | 210/222 |
| 4,116,829 | 9/1978 | Clark | 210/222 |

FOREIGN PATENT DOCUMENTS

| | | | |
|---|---|---|---|
| 1442198 | 7/1976 | Belgium | 210/222 |
| 2628095 | 5/1978 | Fed. Rep. of Germany | 210/222 |

OTHER PUBLICATIONS

"Physics Today", May 1975, John J. Gilman, pp. 46-53.
"IEEE Transactions on Magnetics," vol. MAG-12, No. 6, Nov. 1976, L. I. Mendelsohn et al., pp. 924-926.

Primary Examiner—Frank A. Spear, Jr.
Attorney, Agent, or Firm—Kenyon & Kenyon

[57] ABSTRACT

A device for high gradient magnetic separation contains, between two pole pieces, an ordered filter structure with parts of magnetic material, which are arranged perpendicular to the direction of a magnetic field and the flow direction of a medium to be filtered, the filter structure comprising flat ribbons with a thickness of less than 100 μm of a material with a coercitive field strength $H_c$ less than 0.2 Oe, which are arranged so that their axes and the normals of their flat sides are approximately perpendicular to the direction of the magnetic field, requiring only a very small field strength for magnetizing the filter structure in order to obtain high flux density gradients.

12 Claims, 5 Drawing Figures

DEVICE FOR HIGH GRADIENT MAGNETIC SEPARATION

BACKGROUND OF THE INVENTION

This invention relates to magnetic separation in general and more particularly to a device for high gradient magnetic separation of magnetizable particles from a flowing medium.

A device for separation of magnetic particles from a flowing medium with an ordered filter structure which contains, between the ends of two pole pieces of a magnet device, in a magnetic field of predetermined magnetic field strength directed substantially parallel or antiparallel to the flow direction of the medium, parts of magnetic material of predetermined coercitive field strength $H_c$, which are arranged at least approximately perpendicular to the direction of the magnetic field, is described in DE-OS 26 28 095.

In magnetic separation methods, the fact that, in a sufficiently strong magnetic field, a magnetizable particle is subjected to a force which moves or holds it against other forces acting on it such as the force of gravity or against hydrodynamic friction forces occurring in a liquid medium, is utilized. Such separation methods can be provided, for instance, for steam or cooling water loops in conventional as well as in nuclear power stations. In the liquid or gaseous medium of these loops, particles, which have generally been produced by corrosion, are suspended. These particles are in part ferromagnetic such as magnetite ($Fe_3O_4$), partly antiferromagnetic such as hematite ($\alpha$-$Fe_2O_3$) or paramagnetic such as copper oxide (CuO). These particles, which, in addition, generally appear in different sizes, are therefore differently magnetizable.

Methods and apparatus are known, by means of which even very small particles with diameters in the micrometer range can be filtered magnetically from a flowing medium with a fairly large degree of separation. These methods work with high magnetic fields and, in particular, with very high field gradients. One therefore also speaks of high-gradient magnetic separation. A corresponding separating device is the device described in the above-mentioned DE-OS 26 28 095. It contains an ordered filter structure consisting of a multiplicity of wire screens which are arranged closely one behind the other to form a stack and are arranged perpendicular to the flow direction of the medium in a relatively strong magnetic field which, in the region of the filter structure, is directed, parallel or antiparallel to the direction of the medium and causes there, for instance, a magnetic flux density of at least 0.7 Tesla. The wires consist of a non-corroding ferromagnetic material such as alloy steel and their gauge is very small, for instance, less than 0.1 mm. The wires are magnetized to saturation and the flux density gradients, which may be up to $10^3$ Tesla/cm, are then large enough so that even weakly magnetizable particles can be filtered out of the flowing medium with a relatively large degree of separation.

In such devices for high gradient magnetic separation, strong electromagnets are generally required for magnetizing and, thus, for producing the high flux density gradient, because of the relatively large demagnetization factor of the wires, which may be, for instance, 0.5. Then, however, correspondingly large amounts of conductor material, for instance, of copper, and also, in general, much ferromagnetic material, in the form of yokes and pole pieces for conducting the magnetic flux, must be provided. These magnetic devices are therefore accordingly expensive and also generally consume much energy. The investment and operating costs of such a device for high gradient magnetic separation are therefore relatively high.

It is an object of the present invention to improve the device mentioned at the outset in such a manner that the costs for procuring as well as for operating such magnetic apparatus are reduced in comparison with the known separation devices.

SUMMARY OF THE INVENTION

According to the present invention, this problem is solved by using a filter structure which contains flat ribbons with a thickness of less than 100 $\mu$m of a material with a coercitive field strength $H_c$ of less than 0.2 Oe. The ribbons are arranged so that their axes and the normals of their flat sides are at least approximately perpendicular with respect to the direction of the magnetic field.

Ribbons of corresponding soft-magnetic materials are known per se (see, for instance, "Physics Today",May 1975, pages 46 to 53; "Applied Physics Letters; vol. 26, no. 3, February 1975, pages 128 to 130; "Journal of Applied Physics", vol. 46, no. 4, April 1975, pages 1625 to 1633; and "IEEE Transactions on Magnetics", vol. MAG-12, no. 6, November 1976, pages 924 to 926). These known materials are generally amorphous alloys. Ribbons, which are also called metallic glasses, can be made from them with thicknesses down to less than 50 $\mu$m. With the special alignment of these ribbons in the filter structure, correspondingly high flux density gradients at their longitudinal edges can then be obtained advantageously. In addition, only a very small magnetic field strength is required in the filter structure for magnetizing these ribbons, due to their low coercitive field strength. The advantages connected therewith are then that the magnet devices for producing this field strength can be accordingly small and therefore cost effective.

A filter structure for a separating device according to the present invention may advantageously contain ribbons which are wound in a spiral about an axis parallel to the direction of the magnetic field. The filter structures advantageously contains several ribbons which are arranged one behind as seen in the direction of the magnetic field, and/or also perpendicular thereto, side by side. Such filter structures can befabricated relatively simply and inexpensively.

Furthermore, the aligned ribbons of soft magnetic material can advantageously form, together with further ribbons which are arranged parallel or at an angle to the direction of the magnetic field and consist in particular of non magnetic material, at least one fabric layer. Alternatively, the aligned ribbons may also be applied to at least one support foil of non-magnetic material. Thereby, sufficient mechanical strength of the ribbons with extremely small thickness can be assured.

DETAILED DESCRIPTION OF THE INVENTION

Figure 1:
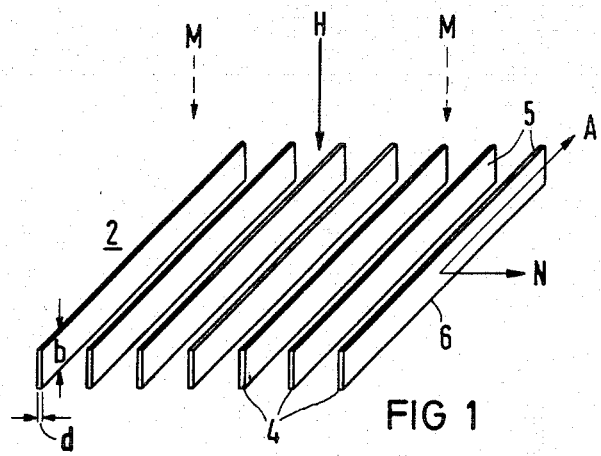
FIG. 1 is a schematic illustration of a filter structure of a device according to the present invention.

The filter structure shown in an oblique view in FIG. 1 is provided for a device of a high gradient magnetic separation system. With this device, very small magnetizable particles, for instance, ferromagnetic particles with particle sizes of less than 1 μm, or even weakly magnetic such as paramagnetic or antiferromagnetic particles can be filtered out of a flowing medium with a relatively high degree of separation. Parts of this separating device not detailed in the figure may be, for instance, corresponding parts of the separating device known from DE-OS 26 28 095.

The filter structure, generally designated as 2, is arranged in the space between the ends of two pole pieces, not shown in the figure, of a magnet apparatus, for instance, of an electromagnet, so that a magnetic field H can be produced therein. A medium M, in which the particles to be separated in the filter structure are suspended, is to be conducted through the filter structure parallel or also antiparallel to the direction of the field H or the magnetic induction connected with it. The flow direction of the medium M is indicated by a few dashed arrows.

The filter structure 2 contains several ribbons 4 which are arranged side by side and of which only seven ribbons are indicated for the sake of clarity. The number of these ribbons is in general substantially larger, for instance, 50. Also, the spacing between adjacent ribbons is substantially smaller and is, for instance, less than 1 mm. The ribbons are fastened in a holding device, not shown in the figure, and are arranged so that their longitudinal axes A and the normals N to their flat sides are at least approximately perpendicular to the direction of the magnetic field H and to the flow direction of the medium M.

According to the present invention, these ribbons consist of a material with a coercive field strength $H_c$ of less than 0.2 Oe. Soft magnetic amorphous alloys of this kind, which are also called metallic glasses, are known per se. Ribbons of very small thickness can be made from these materials. According to the present invention, the thickness d of the ribbons 4 is to be less than 100 μm and preferably, less than 50 μm, for instance, about °μm. Their width b should be comparatively, substantially larger and may be, for instance, several millimeters. With the choice of a large ratio of the width b to the thickness d of the ribbons 4, a correspondingly small demagnetization factor of these ribbons is obtained.

If such ribbons with a very small coercive field strength $H_c$ are used, only a relatively weak magnetic field, for instance, of a few Oersted, is necessary to obtain saturation magnetization of these ribbons. The magnetic device required for this purpose can advantageously be kept accordingly small.

Since the ribbons 4 can be made with an extremely small thickness d, and very high flux density gradients can thus be produced at their longitudinal edges 5 and 6 which are perpendicular to the direction of the magnetic field and to the flow direction of the medium M, even weakly magnetizable particles with particle sizes of less than 1 μm can be filtered out by the filter structure 2 formed thereby, with a relatively high degree of separation.

While in FIG. 1 only a single filter structure 2 is depicted, a device for high gradient magnetic separation will generally be equipped with several such filter structures which are arranged one behind the other as seen in the flow direction.

Figure 2:
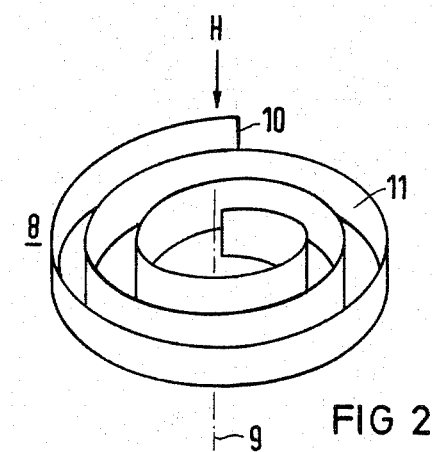
FIGS. 2 to 5, schematically illustrate further filter structures suitable for such a device.

According to the oblique view of FIG. 2, a filter structure 8 can also be formed by a ribbon 10 of a predetermined soft magnetic material which is wound in a spiral about an axis 9. The axis, shown by a dashed line 9, and the flat sides 11 of the ribbons are arranged parallel to the direction of the magnetic field H. In the figure, only a small number of turns of the ribbon 10 is indicated for the sake of greater clarity.

Figure 3:
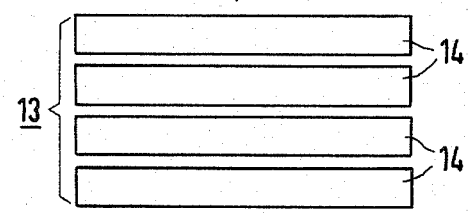

As is evident from the side view of FIG. 3, a filter structure 13 can also contain several ribbon spirals 14 which are arranged one over the other in a stack with respect to the direction of the magnetic field H and each of which corresponds to the ribbon spiral 8 according to FIG. 2.

Figure 4:
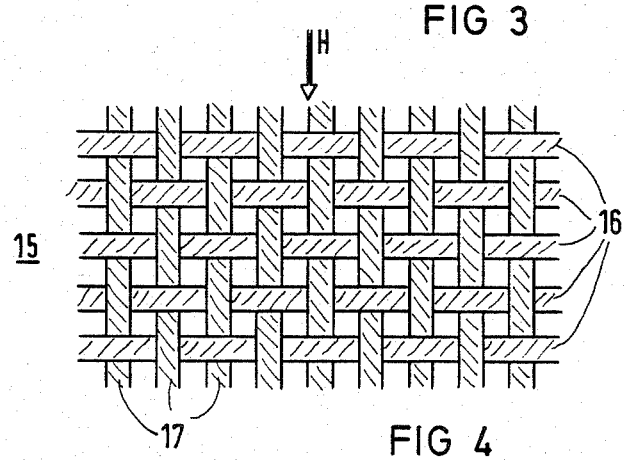

In FIG. 4, a further embodiment of a filter structure for a separating device according to the present invention is shown in a side view. This filter structure contains at least one piece of fabric, generally designated as 15, made of ribbons 16 and 17. The fabric plane is parallel to the onflow direction of the medium to be filtered and to the direction of the magnetic field strength H. One of the two ribbon directions in the fabric, for instance, the direction of the ribbons 16, must then be at least approximately perpendicular to the direction of the magnetic field H, so that, at the longitudinal edges of these ribbons, the high flux density gradients required for the separation process can develop. The ribbons 16 are therefore made of the predetermined soft magnetic material according to the present invention. The ribbons 17 running perpendicular thereto, which therefore extend parallel to the field direction and the flow direction, advantageously consist of a non-magnetic material such as plastic and essentially serve only for holding the ribbons 16. The ribbons 17, however, may also be arranged at an angle to the direction of the magnetic field and may optionally also consist of the soft magnetic material of the ribbons 16.

Figure 5:
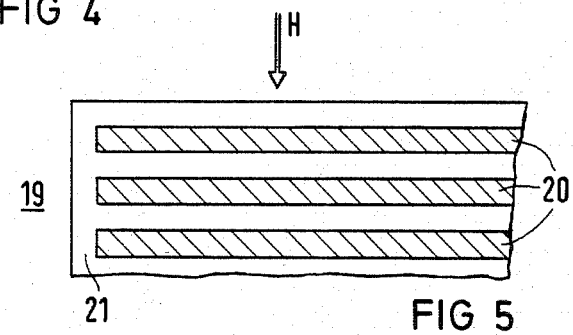

According to the side view in FIG. 5, a filter structure 19 contains several ribbons 20 of the pre-determined soft magnetic material, arranged one behind the other with respect to the direction of the magnetic field H. These ribbons are applied, or for instance, cemented, to a support 21 of non-magnetic material such as plastic foil. The alignment of the ribbons 20 with respect to the magnetic field H corresponds to the alignment of the ribbons 16 of FIG. 4.

In the embodiments of filter structures according to FIGS. 4 and 5, it was assumed that these filter structures comprise at least one flat fabric of predetermined soft magnetic material or a flat support foil with such ribbons. A filter structure suitable for the device according to the present invention may equally well, however, consist of a fabric or a foil which is wound up in a spiral. The arrangement of the spiral shape then corresponds approximately to the arrangement of the ribbons according to FIG. 2. Several of these spirally wound fabrics or support foils can also be stacked for a filter structure as per the embodiment according to FIG. 3.

In FIGS. 1 to 5, filter structures with ribbons are illustrated, the axes of which point exactly perpendicularly relative to the magnetic field and the flow direction. The ribbons can also optionally be arranged so that their axes intersect the direction of the magnetic field at an angle different from 90°.

Cleaning the filter structures in the devices for high gradient magnetic separation according to the present invention of the particles deposited in them can be accomplished in a manner known per se, for instance, by mechanical separation of the particles from the ribbons, by exchanging the ribbons or the filter structures, or by demagnetizing.

Due to the low coercive field strength $H_c$ of the ribbons, the magnetic field strengths required for demagnetizing are advantageously very low and the devices necessary therefor are correspondingly small.

What is claimed is:

1. In a device for the high gradient magnetic separation of magnetizable particles from a flowing medium including an ordered filter structure which contains parts of magnetic material of a predetermined coercitive field strength $H_c$ disposed between the ends of two pole pieces of a magnetic device in a magnetic field which is directed substantially parallel or anti-parallel to the flow direction of the medium, with said parts arranged at least approximately perpendicular with respect to the magnetic direction with respect to the direction of the magnetic field, an improved filter comprising glass-like flat ribbons of a soft magnetic amorphous alloy, with a thickness of less than 100 μm, said soft magnetic amorphous alloy having a coercitive field strength $H_c$ of less than 0.2 Oe, said ribbons wound in a spiral about an axis parallel to the direction of the magnetic field and disposed so that their longitudinal axes and the normals of their flat sides are oriented at least approximately perpendicularly with respect to the direction of the magnetic field, to thereby establish high field gradients in said device.

2. In a device for the high gradient magnetic separation of magnetizable particles from a flowing medium including an ordered filter structure which contains parts of magnetic material of a predetermined coercitive field strength $H_c$ disposed between the ends of two pole pieces of a magnetic device in a magnetic field which is directed substantially parallel or antiparallel to the flow direction of the medium, with said parts arranged at least approximately perpendicular with respect to the magnetic direction with respect to the direction of the magnetic field, an improved filter comprising a plurality of glass-like flat ribbons of a soft magnetic amorphous alloy, with a thickness of less than 100 μm, said soft magnetic amorphous alloy having a coercitive field strength $H_c$ of less than 0.2 Oe, arranged side by side perpendicular to the direction of the magnetic field and disposed so that their longitudinal axes and the normals of their flat sides are oriented at least approximately perpendicularly with respect to the direction of the magnetic field, to thereby establish high field gradients in said device.

3. The filter structure according to claim 1 or 2, comprising aligned ribbons with a thickness of less than 50 μm.

4. The filter structure according to claim 1 or 2, wherein said ribbons are of a material with high remanence.

5. The filter structure according to claim 1 or 2, comprising a plurality of ribbons arranged one behind the other in the direction of the magnetic field.

6. The filter structure according to claim 1 or 2 wherein said ribbons are formed, together with other ribbons, disposed parallel or at an angle to the direction of the magnetic field, into at least one fabric.

7. The filter structure according to claim 6, wherein the fabric plane of said fabric is at least approximately parallel to the direction of the magnetic field.

8. The filter structure according to claim 6 wherein the ribbons disposed parallel or at an angle to the direction of the magnetic field consist of non-magnetic material.

9. The filter structure according to claim 6 wherein said fabric is wound in a spiral about an axis parallel to the direction of the magnetic field.

10. The filter structure according to claim 1 or 2 and further including support elements of non-magnetic material, on which said ribbons are supported.

11. The filter structure according to claim 10, wherein said support elements comprise at least one support foil to which said ribbons are applied.

12. The filter structure according to claim 11, wherein said at least one support foil is wound in a spiral about an axis parallel to the direction of the magnetic field.

* * * * *